(12) United States Patent
Tang et al.

(10) Patent No.: US 9,639,215 B2
(45) Date of Patent: May 2, 2017

(54) TOUCH SCREEN (71) Applicant: SHENZHEN O-FILM TECH CO., LTD, Shenzhen (CN)

(72) Inventors: Genchu Tang, Shenzhen (CN); Shengcai Dong, Shenzhen (CN); Wei Liu, Shenzhen (CN); Bin Tang, Shenzhen (CN)

(73) Assignee: Shenzhen O-Film Tech Co., Ltd., Shenzhen (CN)

( * ) Notice: Subject to any disclaimer, the term of this patent is extended or adjusted under 35 U.S.C. 154(b) by 41 days.

(21) Appl. No.: 13/968,320

(22) Filed: Aug. 15, 2013

(65) Prior Publication Data

US 2014/0293147 A1 Oct. 2, 2014

Related U.S. Application Data (63) Continuation of application No. PCT/CN2013/079161, filed on Jul. 10, 2013.

(30) Foreign Application Priority Data

Mar. 30, 2013 (CN) .......................... 2013 1 0109657

(51) Int. Cl.
*G06F 3/041* (2006.01)
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC ......... G08C 21/00; G06F 3/041; G06F 3/042; G06F 3/043; G06F 3/044; G06F 3/045

(Continued)

(56) References Cited

U.S. PATENT DOCUMENTS

2010/0281409 A1  11/2010  Rainisto et al. .............. 715/767
2012/0206395 A1*  8/2012  Misaki .......................... 345/173
(Continued)

FOREIGN PATENT DOCUMENTS

CN   101206658 A   6/2008
CN   201465069 U   5/2010
(Continued)

OTHER PUBLICATIONS

Korean Examination Summary of corresponding Korea patent Application No. 10-2013-7026488, dated Aug. 30, 2014.
(Continued)

*Primary Examiner* — Kent Chang
*Assistant Examiner* — Mark Edwards
(74) *Attorney, Agent, or Firm* — Hodgson Russ LLP (57) ABSTRACT

A touch screen, includes a position sensing assembly and a display assembly. The position sensing assembly includes: a substrate, a first polymer layer and a second polymer layer, the first polymer layer is formed on a surface of the substrate, a conductive material is embedded in the first polymer layer to form a first conductive area and a first lead on a surface of the first polymer layer, the second polymer layer is formed on a surface of the first polymer layer; a conductive material is embedded in the second polymer layer to form a second conductive material and a second lead on a surface of the second polymer layer. The touch screen omits a transparent conductive film, and achieves an effect of conducting through embedding a conductive material in the first and second polymer layer, thus material cost is relatively low and the producing process is relatively simple.

6 Claims, 7 Drawing Sheets (58) Field of Classification Search
USPC .............................. 178/18.01; 345/173–178
See application file for complete search history.

(56) References Cited

U.S. PATENT DOCUMENTS

| | | | |
|---|---|---|---|
| 2012/0327021 A1* | 12/2012 | Ryu et al. ..................... | 345/174 |
| 2013/0038572 A1* | 2/2013 | Frey et al. .................... | 345/174 |
| 2013/0082961 A1* | 4/2013 | Wang et al. ................... | 345/173 |
| 2014/0041904 A1* | 2/2014 | Pedder .......................... | 174/251 |
| 2014/0152917 A1* | 6/2014 | Lee et al. ....................... | 349/12 |
| 2014/0191771 A1* | 7/2014 | Nam et al. .................... | 324/691 |

FOREIGN PATENT DOCUMENTS

| | | |
|---|---|---|
| CN | 102830851 A | 12/2012 |
| CN | 102903423 A | 1/2013 |
| CN | 103164082 A | 6/2013 |
| KR | 10-2012-0041529 A | 5/2012 |
| KR | 10-2013-0011901 A | 1/2013 |
| TW | 201207524 A1 | 2/2012 |
| TW | 201303669 A1 | 1/2013 |

OTHER PUBLICATIONS

Chinese International Search Report of corresponding International PCT Application No. PCT/CN2013/079161, dated Jan. 9, 2014.
Chinese First Examination Report of corresponding China Application No. 201310109657.7, dated Dec. 5, 2013.
Taiwan Examination Report of corresponding Taiwan patent application No. 102130452, dated Mar. 5, 2015.

* cited by examiner

TOUCH SCREEN

CROSS-REFERENCE TO RELATED APPLICATIONS

This application is a continuation of International Application No. PCT/CN2013/079161, filed on Jul. 10, 2013, which claims the priority benefit of Chinese Patent Application No. 201310109657.7, filed on Mar. 30, 2013, both of which are hereby incorporated by reference in their entireties.

FIELD OF THE INVENTION

The present invention relates to the field of touch control, in particular to a touch screen.

BACKGROUND OF THE INVENTION

A touch screen is also called a "touch control screen", or a "touch panel", which is an inductive liquid crystal display device able to receive an input signal from a contact head etc. When touching graphical buttons on the screen, the tactile feedback system can drive various coupling devices according to a pre-coded program, which can replace a mechanical button panel, and create vivid audio and video effect through the liquid crystal display screen. As a newest computer input device, the touch screen is a simplest, most convenient and natural human-machine interaction mode. A capacitive touch screen works via current induction of the human body. A capacitive touch screen is a four-layer composite glass screen, the inner surface and the interlayer of the glass screen are each coated with a layer of ITO (Indium Tin Oxide transparent conductive film), the outermost layer is a thin protective layer of silica glass, the ITO layer of the interlayer serves as the working surface, four electrodes are lead out at four corners, the ITO layer of the inner layer is a shielding layer so as to ensure good working environment. When a finger touches the metal layer, due to the electrical field of the human body, the user and the surface of the touch screen form a coupling capacitance, for high-frequency current, the coupling capacitance is a direct conductor, hence the finger absorbs a very small current from the contact point. The current flows out from the electrodes of the four corners of the touch screen, and the current flowing through each of the four electrodes is proportional to the distance between the finger and the four corners respectively, a controller obtains the position of the touch point through calculating the proportions of the four currents accurately.

OGS (One Glass Solution) will become the leading technique of the touch control industry. OGS has three advantages: (1) saving cost of a glass layer and cost of an adhering operation; (2) reducing the weight; (3) increasing light transmittance. OGS can better satisfy the ultrathin requirement of an intelligent terminal, and can improve display effect, and certainly will be the choice for high-end brand terminal in the future. In existing OGS touch screen, generally ITO is coated on protective glass, thus the protective glass can act as a sensor and at the same time have protective effect; ITO protrudes from the glass surface.

In prior art, the conductive material of OGS is disposed on one surface of the glass, ITO protrudes from the glass surface, such a conductive material is easily scratched, leading to damage of the device, thus affecting normal use; primary conductive material in OGS is ITO, primary component of ITO is indium, indium is a rare metal, thus the cost is high, and an adhering process is needed during production, which results in high production cost.

SUMMARY OF THE INVENTION

On the basis of this, the present invention provides a touch screen with simpler process and lower cost.

A touch screen, including a position sensing assembly and a display assembly, wherein the position sensing assembly includes: a substrate, having a first surface and a second surface opposite to the first surface; a first polymer layer, formed on the first surface of the substrate; a conductive material is embedded in the first polymer layer to form a first conductive area and a first lead on a surface of the first polymer layer; and a second polymer layer, formed on a surface of the first polymer layer; a conductive material is embedded in the second polymer layer to form a second conductive area and a second lead on a surface of the second polymer layer.

In one of embodiments, a grid-shaped groove is formed in the first polymer layer and the second polymer layer, respectively; the conductive material is filled in the grid-shaped groove.

In one of the embodiments, a grid cycle of the grid-shaped groove of the first lead and the second lead is less than 50, and transmittance is less than 70%.

In one of the embodiments, the grid-shaped groove is regular grid or random grid.

In one of the embodiments, a depth to width ratio of the groove in the first polymer layer and the second polymer layer is larger than 1.

In one of the embodiments, the second polymer layer is provided with a gap, a lead foot of the first lead is located in the gap, and the second lead is positioned on the surface of the second polymer layer.

In one of the embodiments, the position sensing assembly and the display assembly are connected by optical glue.

In one of the embodiments, the touch screen further includes a light shielding layer, located between the first polymer and the substrate; or located between the second polymer layer and the optical glue.

In one of the embodiments, the light shielding layer is located between the second polymer layer and the optical glue, a length of the second polymer layer is less than a length of the first polymer layer and a length of the light shielding layer, and the first lead and the second lead are lead out of the light shielding layer through a hole.

In one of the embodiments, a protective layer is disposed on the surface of the second polymer layer to prevent the conductive material from being oxidized.

In one of the embodiments, the light shielding layer is an ink layer or a black photoresist layer, and a thickness thereof is 1-10 microns.

In one of the embodiments, the substrate is glass.

The above touch screen omits an existing transparent conductive film, and achieves an effect of conducting through embedding a conductive material in the first and second polymer layers, thus material cost is relatively low. The producing and adhering process of the touch screen is relatively simple, and production cost is relatively low.

DETAILED DESCRIPTION OF THE EMBODIMENTS

Please refer to FIG. 1 to FIG. 5, a touch screen 100 according to a first embodiment of the present invention, includes a position sensing assembly 110 and a display assembly 120, where the position sensing assembly 110 includes a substrate 111, a first polymer layer 112 and a second polymer layer 113. The substrate 111 has a first surface 1111 and a second surface 1112 opposite to the first surface 1111. The first polymer layer 112 is formed on the first surface 1111 of the substrate 111; a conductive material is embedded in the first polymer layer 112 to form a first conductive area 114 and a first lead 115 on a surface of the first polymer layer 112. The second polymer layer 113 is formed on a surface of the first polymer layer 112; a conductive material is embedded in the second polymer layer 113 to form a second conductive area 116 and a second lead 117 on a surface of the second polymer layer 113. The position sensing assembly 110 and the display assembly 120 are connected by optical glue 130. In this embodiment, the substrate 111 is of glass material.

Figure 1:
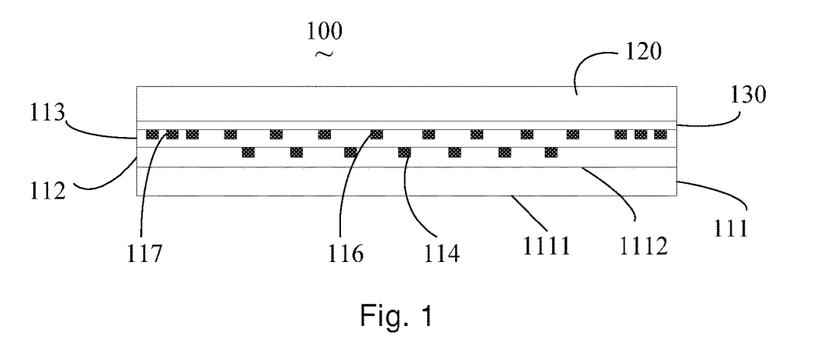
FIG. 1 is a schematic sectional view of a touch screen according to a first embodiment of the present invention.
Figure 2:
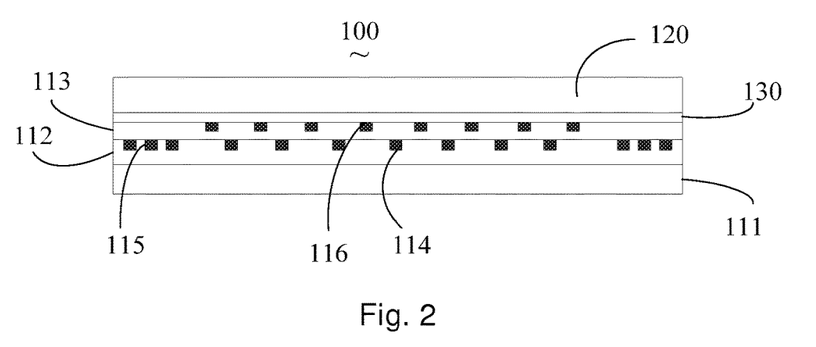
FIG. 2 is another schematic sectional view of the touch screen according to the first embodiment of the present invention.
Figure 3:
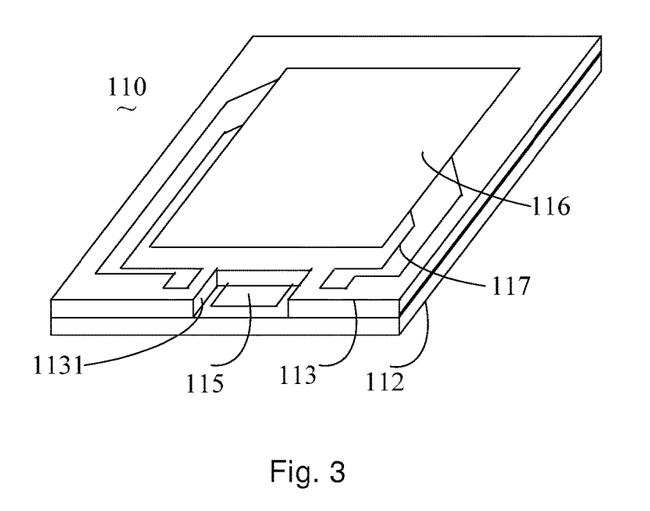
FIG. 3 is a perspective diagram of a position sensing assembly of the touch screen according to the first embodiment of the present invention.

As shown in FIG. 3, for a convenient connection with an external flexible printed circuit board (not shown in Figs.), the second polymer layer 113 is further provided with a gap 1131. Whereby, a lead foot of the first lead 115 is located in the gap 1131. The second lead 117 is positioned on the surface of the second polymer layer 113.

The conductive material is embedded in the first polymer layer 112 and the second polymer layer 113, which is achieved through following implementation: a grid-shaped groove is formed by patterning on the surface of the first polymer layer 112 and the surface of the second polymer layer 113, and the conductive material is filled in the grid-shaped groove.

Figure 4:
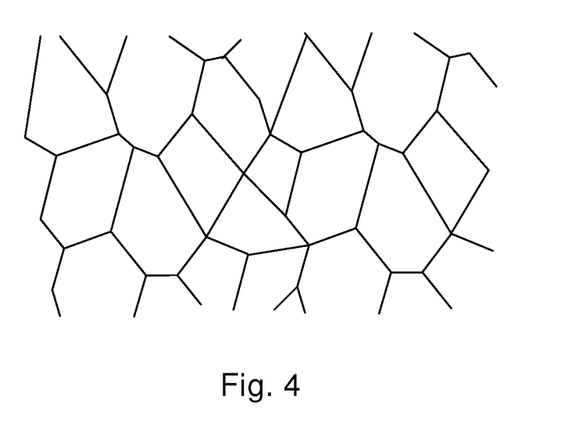
FIG. 4 is a schematic view of a groove with random grid of the position sensing assembly of the touch screen shown in FIG. 3.
Figure 5:
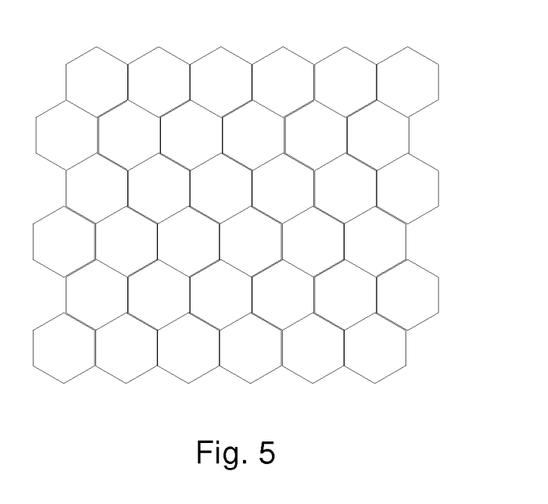
FIG. 5 is a schematic view of a groove with regular grid of the position sensing assembly of the touch screen shown in FIG. 3.

As shown in FIG. 4, the groove is random grid, where the random grid is uniformly distributed in each direction. As shown in FIG. 5, the groove can also be regular grid which is uniformly distributed in each direction. The grooves in the first polymer layer 112 and in the second polymer layer 113 can be of the same shape or different shapes.

In order to stabilize the conductive material in the groove and to ensure conductivity, a depth to width ratio of the groove can be set as larger than 1. A width of the groove in the first lead 115 and the second lead 117 is 1-5 microns, a depth thereof is 2-6 microns, a grid cycle is less than 50, and transmittance is less than 70%; the transmittance of the position sensing assembly 110 is larger than 88.4%.

In order to prevent the conductive material in the groove from being oxidized, optical glue 130 without oxidizability can be used, the following solution can also be adopted: a protective layer is disposed on the surface of the second polymer layer 113 to prevent the conductive material 114 from being oxidized, a thickness thereof is 1 micron. Of course, the above two solutions can be adopted at the same time to prevent the conductive material 114 from being oxidized.

Compared with an existing touch screen, the touch screen 100 according to the present embodiment omits a transparent conductive film, and achieves an effect of conducting through embedding the conductive material in the first and second polymer layers, thus material cost is relatively low. The producing and adhering process of the touch screen 100 is relatively simple, production efficiency is increased, production cost is relatively low, weight is reduced, and by embedding the conductive material in the first and second polymer layer, the structure of the touch screen 100 is thinner as a whole.

Figure 6:
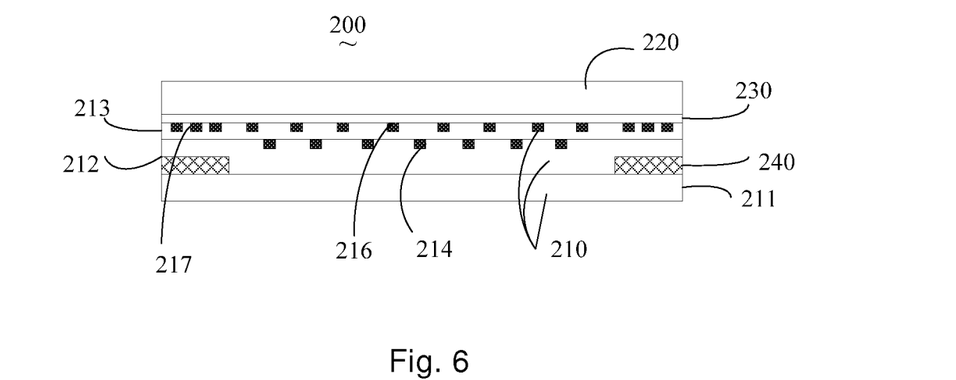
FIG. 6 is a schematic sectional view of a touch screen according to a second embodiment of the present invention.
Figure 7:
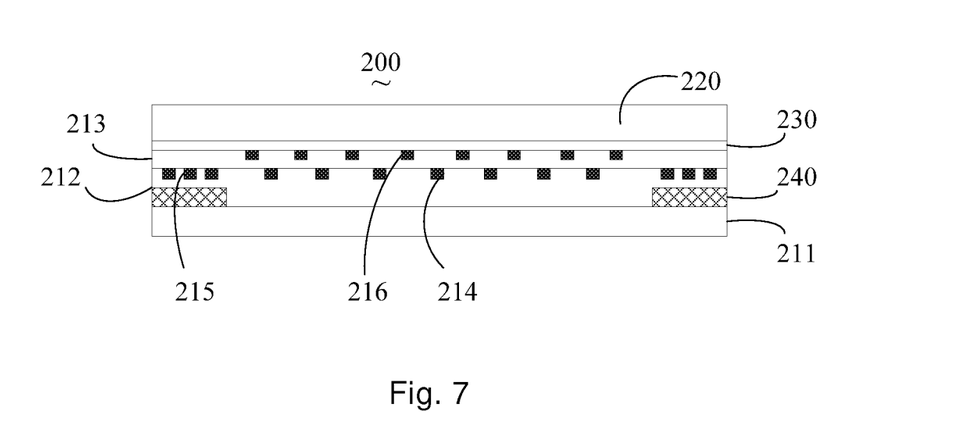
FIG. 7 is another schematic sectional view of the touch screen according to the second embodiment of the present invention.
Figure 8:
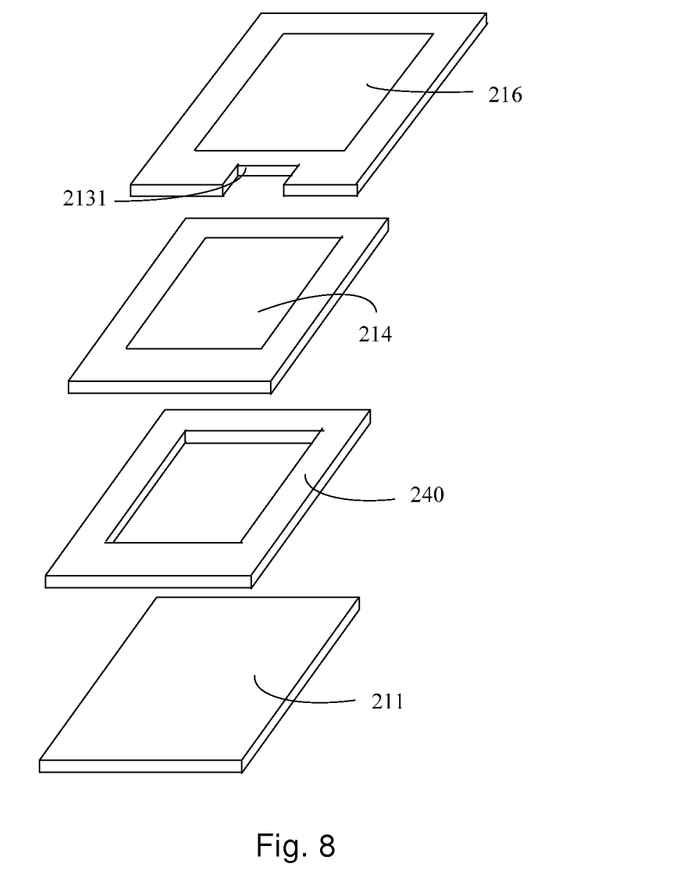
FIG. 8 is a partial exploded schematic view of the touch screen according to the second embodiment of the present invention.
Figure 9:
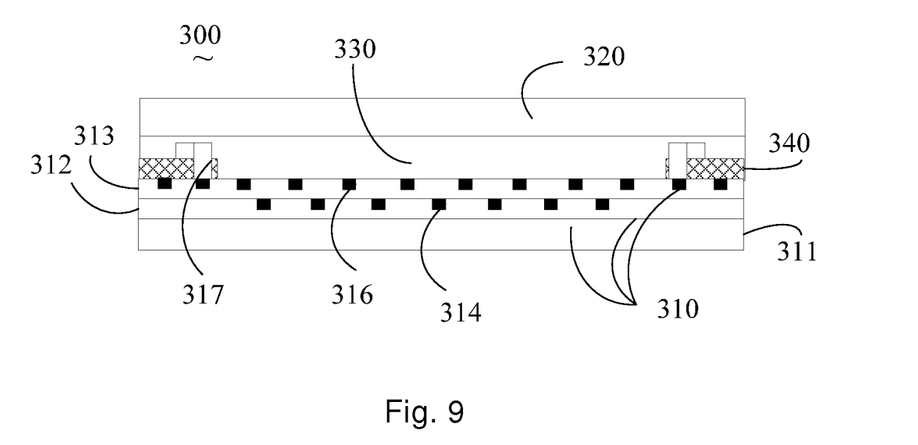
FIG. 9 is a schematic sectional view of a touch screen according to a third embodiment of the present invention.
Figure 10:
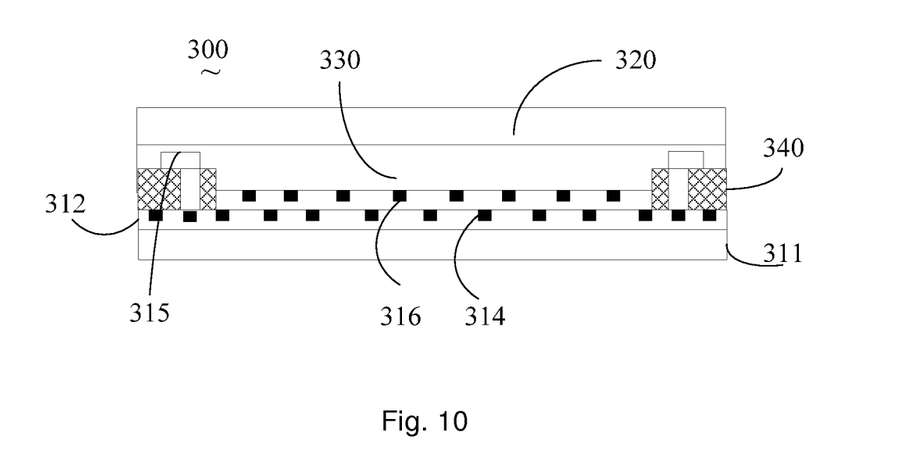
FIG. 10 is another schematic sectional view of the touch screen according to the third embodiment of the present invention.

Please refer to FIG. 6 to FIG. 8, which show a second embodiment of the touch screen according to the present invention, similar to the touch screen 100, a touch screen 200 also includes a position sensing assembly 210 and a display assembly 220. The position sensing assembly 210 also includes a substrate 211, a first polymer layer 212 and a second polymer layer 213. A conductive material is embedded in the first polymer layer 212 to form a first conductive area 214 and a first lead 215 on a surface of the first polymer layer 212. The second polymer layer 213 is formed on the surface of the first polymer layer 212; a conductive material is embedded in the second polymer layer 213 to form a second conductive area 216 and a second lead 217 on a surface of the second polymer layer 213. The position sensing assembly 210 and the display assembly 220 are connected by optical glue 230.

Different from the touch screen 100 of the first embodiment, the touch screen 200 further includes a light shielding layer 240, where the light shielding layer 240 is provided between the first polymer layer 212 and the substrate 211. The light shielding layer 240 is an ink layer or a black photoresist layer, and a thickness thereof is 1-10 microns. Preferably, the thickness of the ink layer can be 6 microns, and the thickness of the black photoresist layer can be 1 micron. In this embodiment, the second polymer layer 213 is provided with a gap 2131. Where, a lead foot of the first lead 215 is located in the gap 2131. The second lead 217 is positioned on the surface of the second polymer layer 213.

Compared with an existing touch screen, the touch screen 200 according to the present embodiment omits a transparent conductive film, and achieves an effect of conducting through embedding the conductive material in the first and second polymer layer, thus material cost is relatively low. The producing and adhering process of the touch screen 200 is simple, production efficiency is increased, production cost is relatively low, weight is reduced, and by embedding the conductive material in the first and second polymer layer, the structure of the touch screen 200 is thinner as a whole. The touch screen 200 is further provided with the light shielding layer 240.

Please refer to FIG. 9 to FIG. 12, which show a third embodiment of the touch screen according to the present invention, similar to the touch screen 200, a touch screen 300 of this embodiment also includes a position sensing assembly 310 and a display assembly 320. The position sensing assembly 310 also includes a substrate 311, a first polymer layer 312 and a second polymer layer 313. A conductive material is embedded in the first polymer layer 312 to form a first conductive area 314 and a first lead 315 on a surface of the first polymer layer 312. The second polymer layer 313 is formed on the surface of the first polymer layer 312; a conductive material is embedded in the second polymer layer 313 to form a second conductive area 316 and a second lead 317 on a surface of the second polymer layer 313. The position sensing assembly 310 and the display assembly 320 are connected by optical glue 330.

Figure 11:
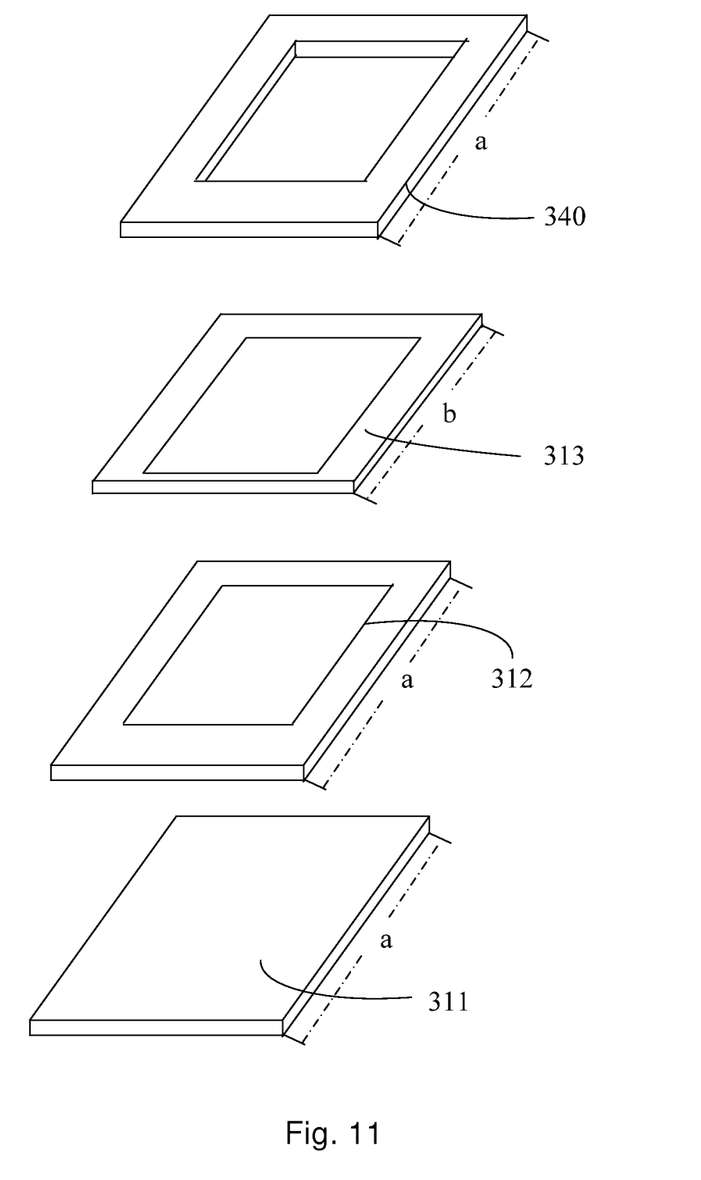
FIG. 11 is a partial exploded schematic view of the touch screen according to the third embodiment of the present invention.
Figure 12:
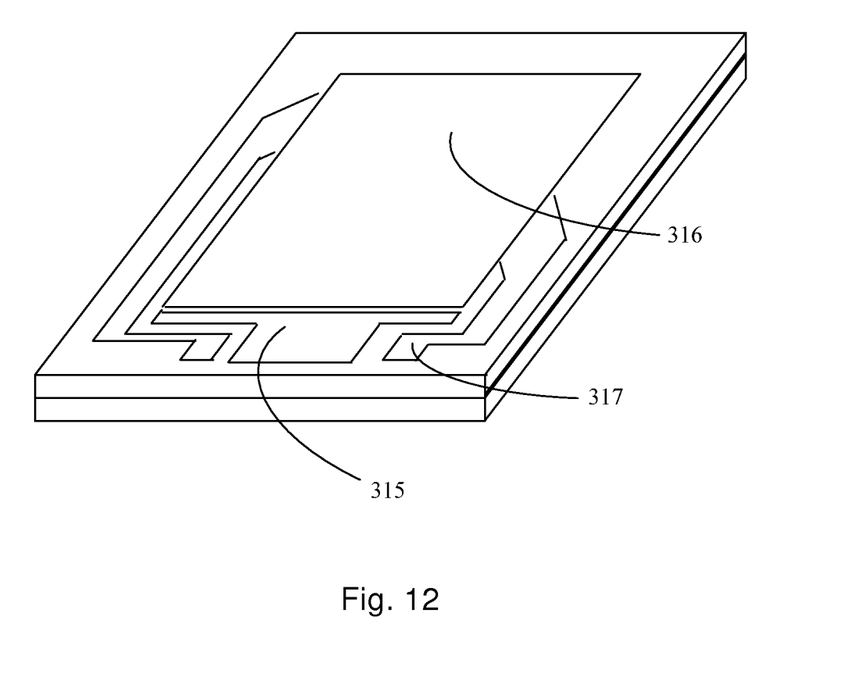
FIG. 12 is a partial perspective diagram of the touch screen according to the third embodiment of the present invention.

The touch screen 300 is also provided with a light shielding layer 340, the difference between the touch screen 300 of the third embodiment and the touch screen 200 of the second embodiment is that positions of the light shielding layers are different. The light shielding layer 340 is located on the surface of the second polymer layer 313, that is, between the second polymer layer 313 and the optical glue 330. As shown in FIG. 11, the substrate 311 of the position sensing assembly 310 and the first polymer layer 312 have the same length a, a length of the second polymer layer 313 is b, b<a, a length of the light shielding layer is also a. The first polymer layer 312 is located above the substrate 311, the second polymer layer 313 is located above the first polymer layer 312, and the display assembly 320 is located above the light shielding layer 340. Viewing as a whole, the length of the second polymer layer 313 is less than the length of the first polymer layer 312, when the second polymer layer 313 is above the first polymer layer 312, an end of the first polymer layer 312 is exposed to form a region, and the first lead 315 is exposed in that region. As shown in FIG. 12, the light shielding layer 340 is located on the second polymer layer 313 and the above region (the region of the first polymer layer 312 exposed relative to the second polymer layer 313), for a convenient connection of the first lead 315, the second lead 317 of the touch screen 300 with an external flexible printed circuit board, the first lead 315 and the second lead 317 are lead out through holes in the light shielding layer 340, a position of the hole from which the first lead 315 is lead out is at the outer edge of the second polymer 313, and a position of the hole from which the second lead 317 is lead out is right above the second polymer 313. A conductive material is embedded in the holes respectively, the first lead 315, the second lead 317 are lead out from the holes of the light shielding layer 340 to a upper surface of the light shielding layer 340. As shown in FIG. 11, the first lead 315 and the second lead 317 are connected with the flexible printed circuit board in a same plane.

Compared with an existing touch screen, the touch screen 300 according to the present embodiment omits a transparent conductive film, and achieves an effect of conducting through embedding the conductive material in the first and second polymer layer, thus material cost is relatively low. The producing and adhering process of the touch screen 300 is simple, production efficiency is increased, production cost is relatively low, weight is reduced, and by embedding the conductive material in the first and second polymer layer, the structure of the touch screen 300 is thinner as a whole. The touch screen 300 is further provided with the light shielding layer 340.

The above embodiments merely describe several implementing modes of the present invention with specific details, but they should not be understood as limiting the scope of the present invention. It should be noted that, for those skilled in the art, they can make multiple modifications and improvements without separating from the spirit of the present invention, which should all fall within the protection scope of the present invention. Therefore, the protection scope of the present invention should be subject to the claims.

The invention claimed is:

1. A touch screen, comprising a position sensing assembly and a display assembly, wherein the position sensing assembly comprises:

a substrate, having a first surface and a second surface opposite to the first surface;

a first continuous polymer layer having a first grid-shaped groove, formed on the first surface of the substrate; wherein a conductive material is filled in the first grid-shaped groove in the first polymer layer to form a first conductive area and a first lead on a surface of the first polymer layer; and a second continuous polymer layer having a second grid-shaped groove, formed directly on a surface of the first polymer layer; wherein a conductive material is filled in the second groove in the second polymer layer to form a second conductive area and a second lead on a surface of the second polymer layer;

wherein a depth to width ratio of the first grid-shaped groove and a depth to width ratio of the second grid-shaped groove are both larger than 1, and wherein the first polymer is a single layer and the second polymer layer is a single layer, wherein the depth of the first grid-shaped groove and the second grid-shaped groove is 2-6 microns, respectively, and the width of the first grid-shaped groove and the second grid-shaped groove is 1-5 microns, respectively, wherein the position sensing assembly and the display assembly are connected by optical glue, wherein the touch screen further comprises a light shielding layer, located between the first polymer layer and the substrate; or located between the second polymer layer and the optical glue, and when the light shielding layer is located between the second polymer layer and the optical glue, a length of the second polymer layer is less than a length of the first polymer layer and a length of the light shielding layer, an end of the first polymer layer is exposed to form a region, and the first lead is exposed in the region, the light shielding layer is located on the second polymer layer and the region, the first lead and the second lead are lead out of the light shielding layer through a hole.

2. The touch screen according to claim 1, wherein the grid-shaped groove is regular grid or random grid.

3. The touch screen according to claim 1, wherein the second polymer layer is provided with a gap, a lead foot of the first lead is located in the gap, the second lead is positioned on the surface of the second polymer layer.

4. The touch screen according to claim 1, wherein a protective layer is disposed on the surface of the second polymer layer to prevent the conductive material from being oxidized.

5. The touch screen according to claim 1, wherein the light shielding layer is an ink layer or a black photoresist layer, and a thickness thereof is 1-10 microns.

6. The touch screen according to claim 1, wherein the substrate is glass.

* * * * *